Patented June 20, 1933

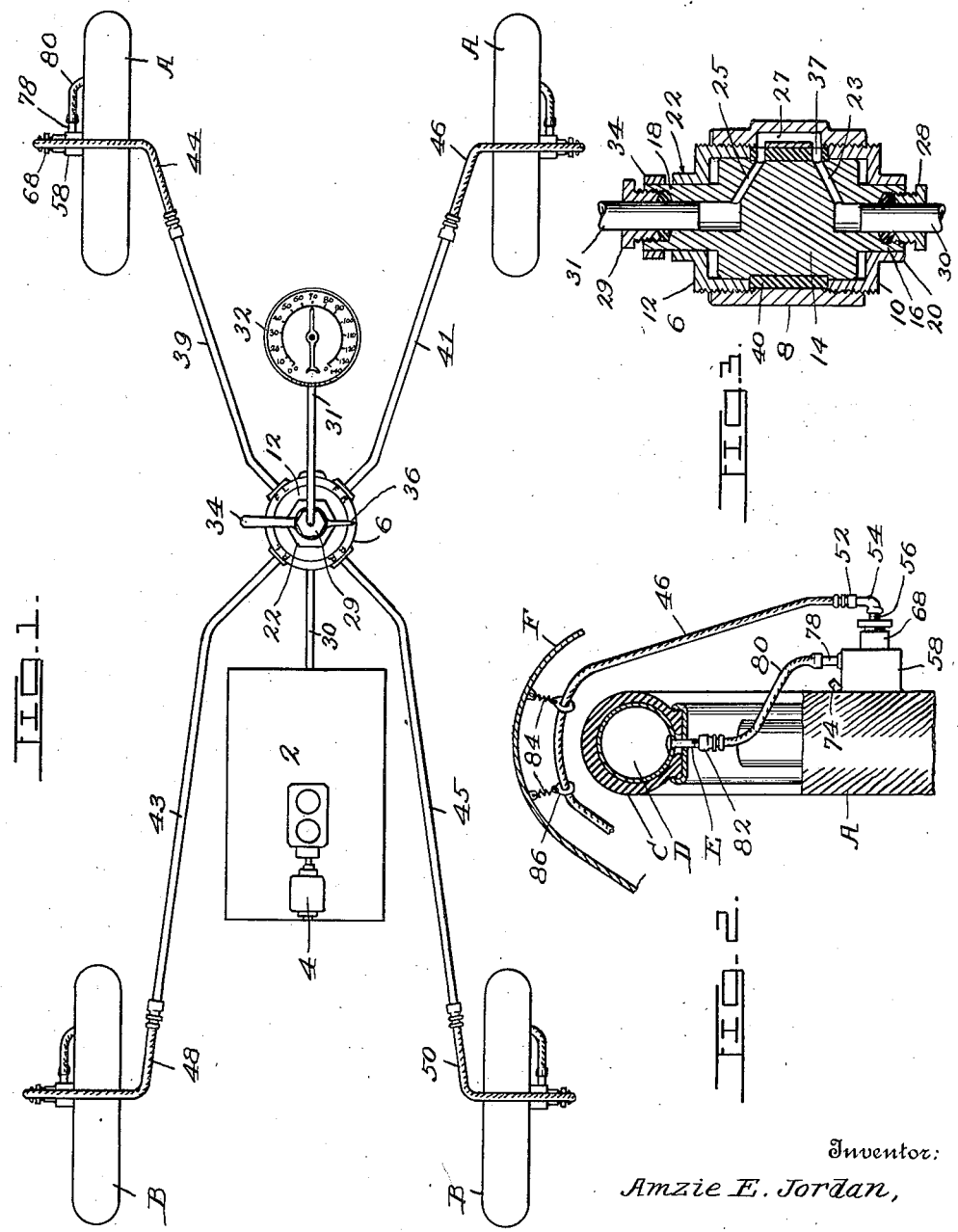

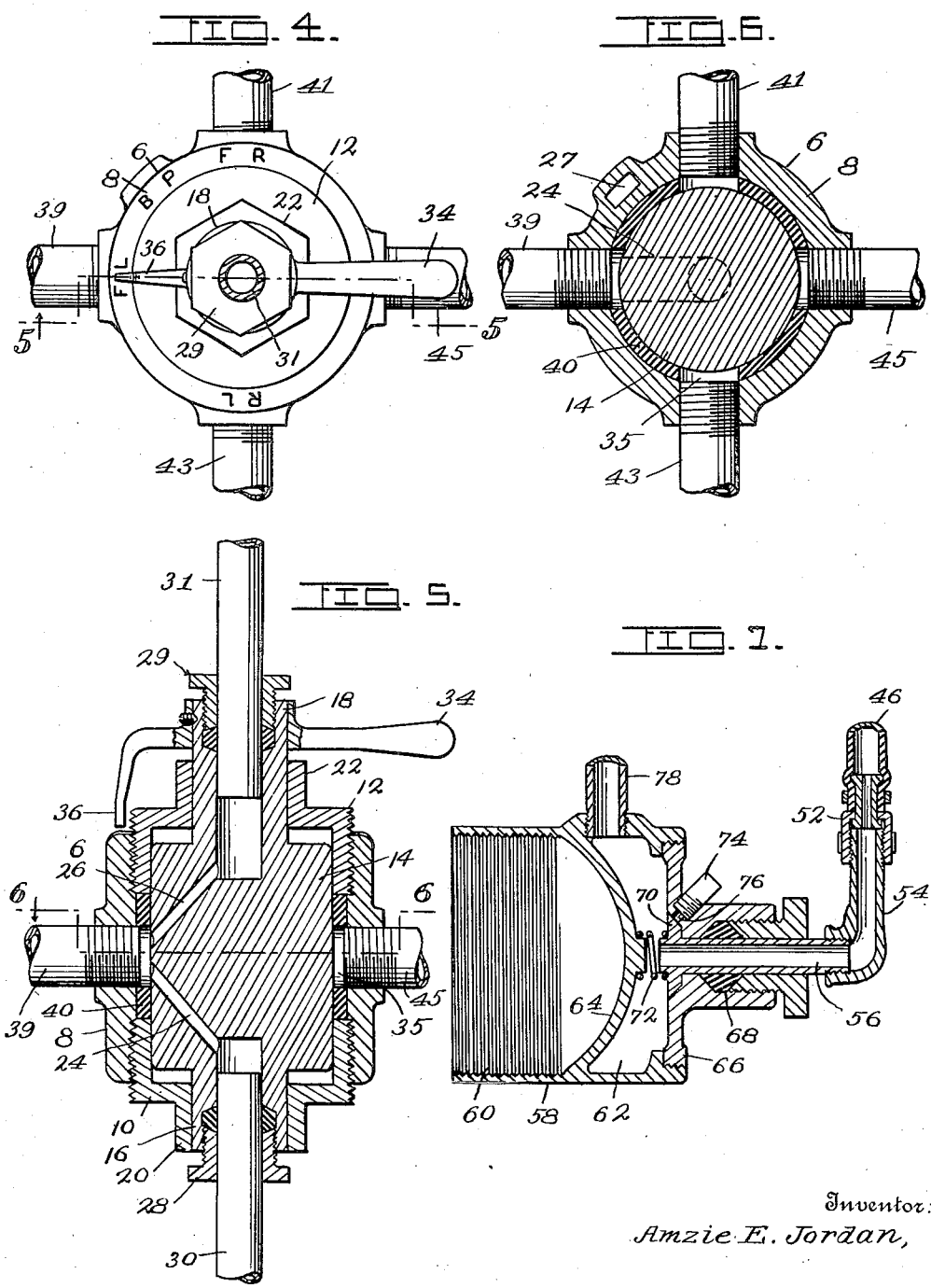

1,915,161

UNITED STATES PATENT OFFICE

AMZIE E. JORDAN, OF BELOIT, KANSAS

APPARATUS FOR INFLATING AND TESTING THE AIR PRESSURE IN PNEUMATIC TIRES

Application filed February 18, 1929. Serial No. 340,865.

My invention relates to apparatus for inflating pneumatic tires and testing the air pressure therein, and one object is to provide means of this character which can be installed on an automotive vehicle and connected to the standard valves of the pneumatic tires for the purpose of inflating the latter to any desired degree.

Another object is to provide an apparatus of this character which can be controlled from the driver's seat and includes one or more gages arranged in front of the driver so that the tires may be inflated and the pressure tested without the driver leaving his position in the motor vehicle.

A further object is to provide a single valve whereby air under pressure may be directed from a source of supply to any tire on the vehicle for the purpose of inflating such tire.

In order that the invention may be fully understood, reference will now be had to the accompanying drawings, in which:

Fig. 1 is a diagram showing the apparatus connected to the wheels and tires of an automotive vehicle.

Fig. 2 is a vertical cross section partly in elevation of one of the front wheels and fenders equipped with a portion of the apparatus.

Fig. 3 is a vertical section of a valve forming an important part of the invention.

Fig. 4 is a plan view of said valve.

Fig. 5 is an irregular vertical section of the valve on line 5—5 of Fig. 4, with the distributing pipes forming a part of the invention in elevation.

Fig. 6 is a horizontal cross section of the valve on line 6—6 of Fig. 5, with the pipes in elevation.

Fig. 7 is a longitudinal section of a hub cap and attachments thereto.

Referring in detail to the different parts, A designates the front tires and B the rear tires of an automotive vehicle. Said tires are of the usual pneumatic type, each consisting of an outer casing C and an inner tube D, which latter is provided with the usual nipple E that holds the inner valve mechanism that opens inwardly for permitting air to be introduced into the tire.

2 designates an air reservoir which may be secured in any suitable manner to the chassis of the vehicle. Air may be forced into the reservoir 2 to the desired pressure by any suitable means. In Fig. 1, I have shown an electrically driven air pump 4 for that purpose.

6 designates a unit in the form of a valve which is preferably located within easy reach of the driver and not only controls the flow of air from the reservoir 4 to the respective tires, but enables the driver to test the air pressure within the reservoir 2 and within the individual tires.

In constructing the valve I employ a casing consisting of an intermediate section 8, and lower and upper sections 10 and 12, respectively, which latter are threaded into the ends of said intermediate section 8. A valve plug 14 is rotatably mounted in the lower and upper sections 10 and 12 and has lower and upper tubular extensions 16 and 18 rotatably mounted in the angular extensions 20 and 22 formed integral with the lower and upper sections 10 and 12, respectively, so that said sections 10 and 12 may be turned with a wrench when assembling the valve.

The tubular extensions 16 and 18 communicate with ducts 24 and 26 extending at an oblique angle to the intermediate peripheral portion of the plug 14 for the purpose of communicating with air distributing means hereinafter referred to. Ducts 23 and 25 also extend at an angle from the tubular extensions 16 and 18 to the intermediate peripheral portion of the plug 14 for communicating with a by-pass 27 formed in the intermediate section 8 of the valve casing, for a purpose hereinafter mentioned. The tubular extensions 16 and 18 have stuffing-boxes 28 and 29 for forming air tight connections with pipes 30 and 31 leading from the reservoir 2 and an air gage 32, respectively. The air gage 32 may be located upon the instrument panel of the motor vehicle or other convenient place within sight of the driver and is calibrated for indicating the air pressure within the reservoir 2 and the front and rear tires A and B, respectively.

The valve plug 14 is rotated by means of a handle 34 secured to the tubular extension 18 and provided with a pointer 36 adapted to sweep over the upper edge of the intermediate valve section 8, which has initials for indicating which tires the various pipes of the distributing means hereinafter described lead to. For instance, the initials F. L. indicate the front left tire, F. R. the front right tire, L. R. the left rear tire, and R. R. the right rear tire. Leakage of air between the rotatable valve plug 14 and its casing is prevented by an intervening annular gasket 40 having ports 35 and 37.

Distributing pipes 39, 41, 43 and 45 lead from the intermediate section 8 of the valve casing to within a short distance of the front left tire, the front right tire, the rear left tire, and the rear right tire and are connected to rubber or other flexible tubes 44, 46, 48 and 50, respectively. Each flexible tube is removably connected by a coupling 52 to one end of an elbow 54 which is secured at its opposite end to a nipple 56 having an axial connection with a hub cap 58, so that the latter may rotate with the respective vehicle wheel without rotating said nipple 56.

The hub caps 58 are alike so only one will be described in detail. As shown more clearly by Fig. 7, the hub cap 58 has an internally threaded tubular portion 60 adapted to be screwed upon the hub of the respective wheel. An air passage 62 is arranged between an internal partition 64 formed integral with the hub cap and a closure 66 threaded into and outer open end of said hub cap. The closure 66 is provided with a stuffing box 68 through which the nipple 56 extends in order to communicate with the air passage 62. The nipple 56 is held from longitudinal movement in the stuffing box 68 by a disk 70 which is formed integral with the inner end of said nipple 56 and has an enlarged inner end with beveled periphery fitting within the closure 66 against which said disk is held by means of a coil spring 72. a lubricating nipple 74 is threaded into the closure 66 and communicates with a passage 76 leading to the beveled periphery of the disk 70 so that a suitable lubricant may be supplied for the purpose of minimizing the friction between the rotatable closure 66 and the stationary disk 70.

A nipple 78 threaded into the periphery of the hub cap 58, communicates at its inner end with the air passage 62 and is connected at its outer terminal to one end of a flexible tube 80 which is removably connected at its outer end by a coupling 82 to the nipple E of the inner tube D of the associate tire.

Resilient hangers 84 depending from the vehicle fenders F are provided at their lower ends with eyes 86 which loosely embrace and support the flexible tubes 44, 46, 48 and 50. The hangers 84 and the eyes 86 support the flexible tubes 44, 46, 48 and 50 above the respective tires and compensate for the differences which occur between the vertical movements of said tires and the fenders when the vehicle is running on the road. The springs 84 also permit the front wheels A to be turned to the right or left in steering the motor vehicle without endangering the connections of the tubes 44, 46, 48 and 50 with the respective distributing pipes and the elbows 54.

With the parts arranged as shown and described it is apparent that when it is desired to test the air pressure within the reservoir 2, it may be readily accomplished by turning the handle 34 until the pointer 36 arrives over the initials B. P. indicating the bypass 27. The foregoing operation rotates the valve plug 14 until the ducts 23 and 25 register with the bypass 27 whereupon air under pressure is free to pass to the indicator 32 through the pipe 30, the tubular extension 16, the duct 23, the bypass 27, the duct 25, the tubular extension 18, and the pipe 31. In order that there may be no leakage of air from the ducts 23 and 25 into the distributing pipes 39, 41, 43 and 45 when said ducts are caused to register with the bypass 27 as stated, the adjacent ends of said ducts 23 and 25 are spaced apart a distance greater than the diameter of said distributing pipes. When it is desired to admit air from the reservoir 2 to one of the tires, for instance the front left tire, the handle 34 is rotated until the pointer 36 reaches the initials F. L., which operation rotates the plug 14 until the ducts 24 and 26 communicate with the pipe 39.

From the foregoing description, taken in connection with the drawings, it is apparent that I have provided testing apparatus that is well adapted for the purpose intended, and while I have shown one form of the invention I reserve all rights to such other forms as properly fall within the spirit and scope of the invention as claimed.

Having thus described my invention, what I claim and desire to secure by Letters Patent, is:

1. A valve comprising a casing having a plurality of peripheral ports, a valve plug rotatably mounted on said casing and having ducts arranged at an angle to each other and adapted to communicate with the peripheral ports as said valve plug is rotated, axial extensions on the valve plug having openings extending therethrough and communicating with said ducts, and means mounted upon one of said extensions for rotating the valve plug.

2. A valve comprising a casing having a plurality of peripheral ports and a bypass, a valve plug rotatably mounted in said casing and having ducts arranged at an angle to each other and adapted to communicate with the peripheral ports and the bypass as said valve plug is rotated, axial extensions on the valve plug having openings extending therethrough and communicating with said ducts, and means mounted upon one of said extensions for rotating the valve plug.

3. A valve comprising a casing having intermediate and end sections, said intermediate section having a plurality of peripheral ports and one of said end sections having indicia which indicate the location of said peripheral ports, a valve plug rotatably mounted in said casing and having ducts arranged at an angle to each other and adapted to communicate with the peripheral ports as said valve plug is rotated, axial extensions on the valve plug having openings extending therethrough and communicating with said ducts, and a handle mounted upon one of said extensions and provided with a pointer for cooperating with the indicia to show the position of the ducts with respect to the peripheral ports.

In testimony whereof I affix my signature.

AMZIE E. JORDAN.